(No Model.)

A. K. STONE.
ADJUSTABLE TIRE SPLICER.

No. 456,169. Patented July 21, 1891.

Witnesses:
E. P. Ellis,
J. W. Nesbit

Inventor
A. K. Stone
per Lehmann & Pattison,
atty.

UNITED STATES PATENT OFFICE.

ANSON K. STONE, OF PINE ISLAND, MINNESOTA.

ADJUSTABLE TIRE-SPLICER.

SPECIFICATION forming part of Letters Patent No. 456,169, dated July 21, 1891.

Application filed December 6, 1890. Serial No. 373,808. (No model.)

*To all whom it may concern:*

Be it known that I, ANSON K. STONE, of Pine Island, in the county of Goodhue and State of Minnesota, have invented certain new and useful Improvements in Adjustable Tire-Splicers; and I do hereby declare the following to be a full, clear, and exact description of the invention, such as will enable others skilled in the art to which it pertains to make and use it, reference being had to the accompanying drawings, which form part of this specification.

My invention relates to an improvement in adjustable tire-splices; and it consists in the construction and arrangement of parts which will be fully described hereinafter, and pointed out in the claims.

The object of my invention is to so construct the tire that it can be tightened at any time without the necessity of having to cut the tire in the usual manner and to dispense with the tire-bolts which are generally used.

Figure 1:
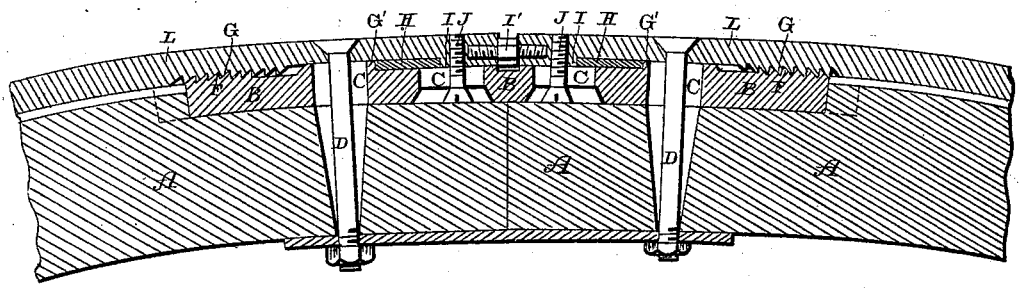
Figure 2:
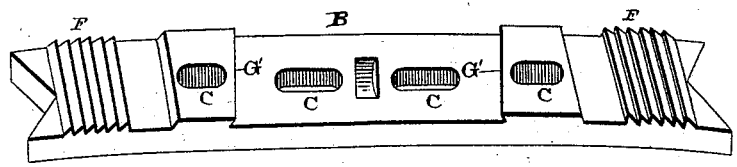
Figure 3:
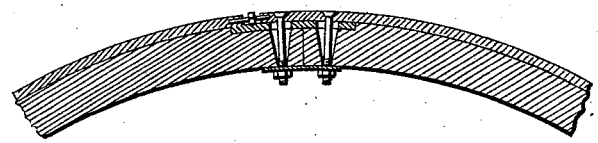
Figure 4:

Figure 1 represents a vertical section of a tire-splice which embodies my invention. Fig. 2 is a perspective of the stiffening-plate alone. Fig. 3 shows a modification. Fig. 4 is a cross-section of the tire.

A represents the felly, which has a recess made in its outer edge at the point where the tightening of the tire is to take place and in which the stiffening-plate B is placed, the ends of the plate being recessed, as shown, so as to catch over corresponding points or projections on the felly at the ends of the recess in which the stiffening-plate is placed, so as to hold the plate in position and prevent it from having any lateral movement at any time. This plate extends across the joint in the felly and serves to brace and strengthen the felly at this point and prevent any bending or giving from any position. This plate being applied to the outer side of the felly, and the usual felly-plate being applied to its inner side, the felly is as strong at this point as at any other. This stiffening-plate is provided with four longitudinal slots C, through the two outer edges of which the usual tire-bolts D are passed. The holes through the felly and through which these bolts pass are made conical, so that the bolts can follow the movement of the tire when it is being tightened. Upon the tops of the ends of these stiffening-plates are formed ratchets or teeth F, which engage with corresponding ratchets or teeth G upon the inner side of the ends of the tire, and thus prevent any backward movement of the ends of the tire while it is being tightened. Formed upon the outer side of the stiffening-plate at any suitable point are the two shoulders G', which are cut at a slight angle and behind which the tapering blocks or wedges H are made to catch. Formed upon the inner sides of the two ends of the splice are corresponding shoulders I, which are preferably straight, and between these two sets of shoulders blocks or wedges are driven for the purpose of forcing the ends of the splice together. Different widths of blocks or wedges may be used, so that when one ceases to tighten the tire they may be pushed out and wider ones driven into their places. The two ends of the splice are connected by means of a right-and-left-hand screw I', by means of which the ends of the splice are not only held in contact, but may be tightened and loosened at the will of the operator.

In order to connect the ends of the splice rigidly to the stiffening-plate, the short screws J are passed through the two inner slots in the plate directly into the splice at its thickened ends. The slots allow the screws to follow the movement of the ends of the splice as they are being loosened or tightened.

The two pieces L, which form the splice, are short pieces of tire, which are welded to the main tire before the tire is applied to the wheel. Formed upon the middle of the inner side of the tire and extending entirely around the wheel is the small V or other shaped flange, which may either be straight or extend back and forth upon the tire, and which flange cuts sufficiently into the outer edge of the felly to hold the tire in place without the help of the usual tire-bolts used for this purpose.

The tire may be formed entirely separate from the stiffening-plate, or it may be rigidly connected to the plate at one end and then have the other end of the tire to entirely overlap the stiffening-plate, as shown in Fig. 3.

Having thus described my invention, I claim—

1. The combination of the felly having a suitable recess, a stiffening-plate placed in the recess, the splice, and bolts which are passed through the splice, the stiffening-plate, and felly, the screws which secure the ends of the splice to the stiffening-plate, and the screw for connecting the ends of the splice, substantially as described.

2. The combination of the felly having a recess and transverse openings, a stiffening-plate having two end and two intermediate longitudinal slots, the splice having openings which register with the transverse openings in the felly, bolts which pass through the splice, stiffening-plate, and the felly, and screws which pass through the intermediate openings of the stiffening-plate into the ends of the splice and secure the parts together, substantially as specified.

3. In a device of the character described, the combination of the felly having a recess and transverse openings, a stiffening-plate having longitudinal end openings and longitudinal intermediate openings which have their under walls cut away to accommodate the head of a screw, the splice, the bolts which pass through the splice, the stiffening-plate, and the felly, and screws which pass through the intermediate openings from the under side and into the ends of the splice and secure the parts adjustably together, substantially as set forth.

In testimony whereof I affix my signature in presence of two witnesses.

ANSON K. STONE.

Witnesses:
LOOMIS F. IRISH,
WILLIAM RICHTMAN.